3,431,064
ANTIEVAPORANT PROCESS AND COMPOSITION
Richard C. Fox, San Rafael, Calif., assignor to Chevron Research Company, a corporation of Delaware
No Drawing. Filed Dec. 23, 1964, Ser. No. 420,800
U.S. Cl. 21—60.5
Int. Cl. C09k 3/00; E03b 3/40
3 Claims

ABSTRACT OF THE DISCLOSURE

Composition for retarding water evaporation consisting essentially of from 70 to 99.4% by weight of a hydrocarbon oil, from 0.5 to 10% by weight of a wax and from 0.1 to 20% by weight of rosin, polymerized rosin, maleic acid modified rosin, hydrogenated rosin, disproportionated rosin, amine and ester derivates of same.

---

This invention relates to a process and compositions which are effective in reducing evaporation of water. More specifically, the invention is concerned with compositions which are applied to the surface of water and ponds, lakes and reservoirs, etc., and will significantly reduce loss by evaporation.

The loss of water from open storage by evaporation is a well-known problem that is becoming more serious with the world industrial growth and population boom and the consequent increased use of water for industrial, personal and farming uses. The evaporation loss is particularly high in arid, desert areas—such as the southwestern part of the United States, where water conservation is of the highest importance due to the initial scarcity of water in these low-rainfall areas. Loss of water in the United States has been estimated to be as high as 70% of the total rainfall or as much as the total required by the cities and towns of the country.

It is known that certain high molecular weight alcohols, in particular cetyl alcohol, are effective as a monolayer upon water surfaces in reducing water evaporation. However, the high cost of the alcohols, the difficulty in keeping the monolayer spread under wind conditions and the fact that certain types of bacteria are supported by the alcohols thus makes them not entirely satisfactory for this purpose. It is thus of great importance to provide compositions which will disperse easily upon water surfaces, successfully reduce evaporative loss of water, be comprised of materials of sufficiently low cost to make application of the composition to large bodies of water practicable and be resistant to destruction of the film by wind and wave action.

It has now been found that evaporation of water can be successfully retarded by the application to the water of a composition comprising from about 70% to 99.4% by weight of a hydrocarbon oil, from 0.5% to 10% by weight of a wax and from 0.1% to 20% by weight of a rosin-based surfactant material.

The hydrocarbon oils which may be employed in the composition of this invention include mineral lubricating oils such as naphthenic base and paraffinic base lubricating oils, etc. It is also desirable that the oil should not evaporate easily, therefore, it should boil predominantly above about 500° F. Particularly suitable are those oils that have an initial boiling point above 600° F. It is preferred that the oil have a viscosity of from about 50 to 500 SSU at 100° F. More viscous oils are not desirable because of difficulty encountered in spreading the films obtained.

The waxes which are employed in the composition of this invention are petroleum waxes and are, more preferably, paraffin waxes. Paraffin wax is a solid, crystalline, hydrocarbon mixture wholly derived from that portion of crude petroleum commonly designated paraffin distillates; from shale distillates; or from hydrocarbon synthesis, by low temperature solidification and expression or by solvent extraction. It is distinguished by its solid state at room temperature, relatively slight deformation at this temperature, even under considerable pressure and low viscosity, from 35 to 45 SSU at 210° F. when melted. Preferably, the waxes are highly normal paraffinic because these waxes disperse as platelets in the oil phase of the composition. The platelets are especially effective in forming a water vapor barrier. Although the paraffinic waxes are most desirable, microcrystalline waxes and mixtures of microcrystalline and paraffinic waxes may also be employed in the compositions of the invention. Natural waxes such as bees wax, etc., may also be used, however, they are somewhat less effective than the paraffinic waxes.

The surfactant materials which may be employed in the compositions of this invention are derivatives of rosin. Rosin itself or colophony is a solid, resinous material obtained primarily from the slump wood of pine trees. The principal ingredients of rosin are resin acids, chiefly abietic acid. Small amounts of non-acid materials are also present. The rosins may be modified by polymerization, disproportionation or hydrogenation to increase stability and improve various physical properties. Rosins which have been so treated are known as modified rosins. Additionally, the modified or unmodified rosins may be converted to carboxylic acid derivatives. Such compounds are known as rosin derivatives.

The materials which have been found to be effective as surfactants in the composition thus include a variety of modified rosins and rosin derivatives. A general description of these materials may be found in Kirk-Othmer, Encyclopedia of Chemical Technology, volume 11, pages 779–809. The following types of materials are examples of suitable rosin-based surfactants:

I. Maleic acid modified rosins: Rosin which is reacted with maleic anhydride at elevated temperatures (above 100° C.) to produce maleic anhydride adducts. Related alkyd resin products are also suitable.

II. Hydrogenated rosin.

III. Disproportionated rosins: Rosin which is treated to form an aromatic nucleus within the rosin acids. The rearrangement is accomplished by contact by mineral acids or heating at temperatures above 270° C. for long periods with a disproportionation catalyst such as selenium, sulfur, iodine or a noble metal on carbon supports.

IV. Polymerized rosins: Rosin material which has been treated to dimerize the abietic acid portion. The purified dimer is also effective.

V. Esterified unmodified and modified resins: Included among these common derivatives are the esters of mono- and polyhydric alcohols with unmodified rosin and with the modified rosins which are described in I to IV above. Examples which are especially suitable in the compositions of this invention are glycerol and pentaerythritol esters of maleic modified rosins. Other suitable materials include glycerol esters of hydrogenated rosin, polymerized rosins, etc. Other common esters are derivatives of ethylene glycol. Other polyhydric alcohols which may be employed include propylene glycol, diethylene glycol, triethylene glycol, dipentaerythritol, mannitol, sorbitol and similar materials. The monohydric alcohols, such as methanol, ethanol, propanol, butanol, etc., are also useful.

VI. Amine derivatives of rosin: The most important example of these materials is dehydroabietylamine.

The suitable materials also include various combinations of the above-mentioned materials. For example, as previously mentioned, esters of modified rosins are suitable surfactants. Likewise, amine derivatives of various "modified," e.g., polymerized, hydrogenated, etc., rosins are suitable.

The surfactants are employed in amounts of from 0.1 to 20% by weight of the total composition. Amounts of from 1 to 10% by weight are preferred.

The antievaporant compositions of the invention are contacted with the surface of the water by pouring them onto the surface of the water and allowing the material to spread. The spreading may be accomplished without the aid of a supplementary agent, however, if desired, a hydrocarbon having from 5 to 10 carbon atoms may be employed to aid in the dispersal. Examples of hydrocarbons suitable for this purpose are normal pentane, normal hexane, normal octane, isooctane, etc. Mixtures of the hydrocarbons, such as petroleum distillates, may be employed. When using this supplementary hydrocarbon spreading agent, it is employed in amounts of up to 60% by weight of the total composition. In dispersing the antievaporant compositions, they may be emulsified with any of the commonly known emulsifying agents and the resulting emulsion poured onto the surface of the water. Examples of emulsifying agents which may be employed are alkyl benzene sulfonates, aliphatic and aromatic quaternary amines, etc.

The following examples illustrate the methods and compositions of this invention. The examples are, of course, only illustrative and not limiting.

EXAMPLE I

Tricomponent compositions were prepared utilizing 4% 140/142 AMP paraffin wax, 86% of a solvent-refined paraffin-base lubricating oil having a viscosity of about 105 SSU at 100° F. and 10% of each additive. The additives employed were as follows:

A. Dehydroabiethylamine, technical grade, amine content 92%, neutralization equivalent.

B. Glycerol ester of hydrogenated rosin, drop softening point 81° C., acid number 5.5.

C. Glycerol ester of hydrogenated rosin, drop softening point 84° C., acid number 8.

D. Dimerized resin acids, drop softening point 152° C., acid number 145.

E. Pentaerythritol ester of rosin, drop softening point 112° C., acid number 12.

F. Pentaerythritol ester of modified rosin, softening point 135° C., acid number 14.

G. Glycerol ester of rosin, drop softening point 92° C., acid number 6.5.

H. Maleic alkyd-modified ester of rosin, drop softening point 168° C., acid number 36.

I. Glycerol ester of polymerized rosin, drop softening point 112, acid number 6.

J. Ethylene glycol ester of polymerized rosin, drop softening point 83° C., acid number 7.

K. Polymerized rosin, 40% dimeric resin acids, acid number 148.

L. Hydrogenated rosin, drop softening point 75° C., acid number 167.

In the test, the antievaporant compositions were placed on the surface of water in a vessel wherein the surface area was 120.25 sq. in. (0.835 sq. ft.). Two controls were employed using no coating, and each of the compositions was tested in other vessels. Each antievaporant composition was added to the water surface at a 1 gm./sq. ft. concentration. The loss of water by evaporation was measured and recorded in 1/16 inch at the end of 7, 14 and 21 days. The percentage efficiency of each antievaporant composition was calculated as:

$$\frac{100 \times \text{average change depth controls} - \text{change depth treatment}}{\text{Average change of depth of controls}}$$

Table I following sets forth these data:

TABLE I

| Surfactant | Initial reading | 7-day reading | Amount lost 7 days | Percent efficiency 7 days | Reading 14 days | Amount lost 14 days | Percent efficiency 14 days | Reading 21 days | Amount lost 21 days | Percent efficiency 21 days |
|---|---|---|---|---|---|---|---|---|---|---|
| None (control) | 1-4/16 | 2-10/16 | 22/16 | | 4-2/16 | 46/16 | | | 59/16 | |
| None (control) | 1-6/16 | 2-12/16 | 22/16 | | 4-1/16 | 43/16 | | | 60/16 | |
| A | 1-6/16 | 2-5/16 | 15/16 | 31.8 | 3-1/16 | 29/16 | 38.46 | 3-9/16 | 35/16 | 40.17 |
| B | 1-7/16 | 2-9/16 | 9/16 | 38 | 2-6/16 | 15/16 | 67.03 | 2-7/16 | 16/16 | 72.65 |
| C | 1-3/16 | 2-3/16 | 16/16 | 30 | 2-2/16 | 31/16 | 31.86 | 2-3/16 | 32/16 | 45.29 |
| D | 1-5/16 | 1-14/16 | 9/16 | 58 | 2-4/16 | 15/16 | 67.03 | 2-6/16 | 17/16 | 70.94 |
| E | 1-3/16 | 1-9/16 | 6/16 | 72.7 | 1-3/16 | 11/16 | 78.02 | 1-15/16 | 12/16 | 79.48 |
| F | 1-2/16 | 1-5/16 | 3/16 | 86.4 | 1-7/16 | 5/16 | 89.01 | 1-8/16 | 6/16 | 89.74 |
| G | 1-2/16 | 1-7/16 | 5/16 | 77.3 | 1-8/16 | 6/16 | 86.81 | 1-10/16 | 8/16 | 86.32 |
| H | 1-3/16 | 1-7/16 | 4/16 | 82 | 1-8/16 | 5/16 | 89.01 | 1-9/16 | 6/16 | 89.74 |
| I | 1-6/16 | 1-8/16 | 2/16 | 91 | 1-8/16 | 2/16 | 95.6 | 1-8/16 | 2/16 | 96.58 |
| J | 1 | 1-1/16 | 1/16 | 95.5 | 1-3/16 | 3/16 | 93.4 | 1-4/16 | 4/16 | 96.58 |
| K | 1-4/16 | 1-10/16 | 6/16 | 72.7 | 1-11/16 | 7/16 | 84.6 | 1-13/16 | 9/16 | 84.61 |
| L | 1-3/16 | 1-15/16 | 12/16 | 45.4 | 2-4/16 | 17/16 | 62.3 | 2-6/16 | 19/16 | 67.52 |

EXAMPLE II

Tests were performed employing the same antievaporant composition as in Example I at a concentration of 0.1 gm./sq. ft. Table II sets forth the data from these tests.

TABLE II

| Surfactant | Initial reading | 7-day rzeading | Amount lost 7 days | Percent efficiency 7 days | Reading 14 days | Amount lost 14 days | Percent efficiency 14 days | Reading 21 days | Amount lost 21 days | Percent efficiency 21 days |
|---|---|---|---|---|---|---|---|---|---|---|
| A | 1-1/16 | 1-8/16 | 7/16 | 63.15 | 2-4/16 | 19/16 | 37.7 | 2-13/16 | 28/16 | 30.9 |
| B | 1-1/16 | 1-6/16 | 5/16 | 73.7 | 1-15/16 | 14/16 | 54.1 | 2-6/16 | 21/16 | 48.0 |
| C | 1-2/16 | 1-12/16 | 10/16 | 47.4 | 2-5/16 | 18/16 | 41.0 | 2-13/16 | 26/16 | 35.8 |
| D | 1-3/16 | 1-9/16 | 6/16 | 68.4 | 2-1/16 | 14/16 | 54.1 | 2-6/16 | 19/16 | 53.0 |
| E | 15/16 | 1-6/16 | 7/16 | 63.2 | 1-14/16 | 9/16 | 70.5 | 2-6/16 | 19/16 | 53.0 |
| F | 1-3/16 | 1-10/16 | 8/16 | 57.9 | 2-5/16 | 18/16 | 41.0 | 3-6/16 | 29/16 | 28.4 |
| G | 1-2/16 | 1-4/16 | 2/16 | 89.5 | 1-8/16 | 6/16 | 80.3 | 1-15/16 | 13/16 | 68.0 |
| H | 1-1/16 | 1-7/16 | 6/16 | 68.4 | 1-15/16 | 14/16 | 54.1 | 2-9/16 | 24/16 | 40.8 |
| I | 1 | 1-4/16 | 4/16 | 78.9 | 1-9/16 | 9/16 | 70.5 | 1-14/16 | 14/16 | 65.5 |
| J | 1-2/16 | 1-5/16 | 3/16 | 84.2 | 1-12/16 | 10/16 | 67.2 | 1-10/16 | 14/16 | 55.5 |
| K | 1 | 1-6/16 | 6/16 | 68.4 | 1-12/16 | 12/16 | 60.7 | 2-3/16 | 19/16 | 53.0 |
| L | 1-3/16 | 1-14/16 | 11/16 | 42.1 | 2-13/16 | 10/16 | 67.3 | 3-13/16 | 26/16 | 35.8 |

As shown by the test data, the antievaporant compositions of this invention significantly reduce loss of water when applied to the surface. As noted before, they may be applied by pouring onto the surface of water, by mixture with a hydrocarbon dispersing agent and pouring onto the surface, by dispersion as an emulsion, etc. They may also be applied continuously to the surface by various methods, such as metering from a tank, etc. When they are dispersed by metering, the flow is adjusted to maintain the concentration of antievaporant on the surface within desired limits. For example, depending upon the prevailing wind conditions and thus the amount of wave action, it may be desirable to employ larger amounts of the material. Usually between 0.05 and 2.0 gms. per sq. ft. are sufficient. Amounts of from 0.1 to 1.2 gms. per sq. ft. are preferred.

I claim:
1. The method of suppressing the evaporation of water which consists of contacting the surface of the water with a composition consisting essentially of from 70.0 to 99.4% by weight of a hydrocarbon oil boiling predominantly above about 500° F., from 0.5 to 10% by weight of a petroleum wax and from 0.1 to 20% by weight of a surfactant material selected from the group consisting of (a) rosin, (b) polymerized rosin, (c) maleic acid modified rosin, (d) hydrogenated rosin, (e) disproportionated rosin, amine derivatives of (a) through (e) and ester derivatives of (a) through (e).

2. The method of claim 1 wherein the surface-active material is an ester of a polybasic acid having not more than 10 carbon atoms.

3. As an antievaporant composition, a material consisting essentially of from 70.0 to 99.4% by weight of a hydrocarbon oil boiling predominantly above about 500° F., from 0.5 to 10% by weight of a petroleum wax and from 0.1 to 20% by weight of a surfactant material selected from the group consisting of (a) rosin, (b) polymerized rosins, (c) maleic acid modified rosins, (d) hydrogenated rosins, (e) disproportionated rosins, amine and ester derivatives of (a) through (e).

References Cited

UNITED STATES PATENTS

| | | | |
|---|---|---|---|
| 2,397,805 | 4/1946 | Ott | 106—230 |
| 2,496,566 | 2/1950 | Szwarc | 106—230 X |
| 3,095,263 | 6/1963 | Eckert et al. | 21—60.5 |

OTHER REFERENCES

Schwartz et al.: "Surface Active Agents and Detergents," vol. II, 1958, Interscience Publishers, Inc., New York, p. 100.

MORRIS O. WOLK, *Primary Examiner.*

B. S. RICHMAN, *Assistant Examiner.*

U.S. Cl. X.R.

252—351, 356, 357, 384